United States Patent [19]

Nozaki

[11] Patent Number: 4,825,231

[45] Date of Patent: Apr. 25, 1989

[54] CAP MECHANISM FOR USE WITH AN INK JET HEAD

[75] Inventor: Masahiro Nozaki, Iwate, Japan

[73] Assignee: Alps Electric Co., Ltd., Japan

[21] Appl. No.: 82,832

[22] Filed: Aug. 6, 1987

[30] Foreign Application Priority Data

Sep. 25, 1986 [JP] Japan ................................ 61-224897

[51] Int. Cl.[4] .............................................. G01D 15/18

[52] U.S. Cl. ................................................. 346/140 R

[58] Field of Search .......................................... 346/140

[56] References Cited

U.S. PATENT DOCUMENTS 4,410,900 10/1983 Terasawa ............................ 346/140
4,543,591 9/1985 Terasawa ............................ 346/140
4,587,535 5/1986 Watanabe ............................ 346/140
4,631,554 12/1986 Terasawa ............................ 346/140
4,631,556 12/1986 Watanabe ............................ 346/140

*Primary Examiner*—Hartary Joseph W.

*Attorney, Agent, or Firm*—Guy W. Shoup; Paul J. Winters; Norman R. Klivans

[57] ABSTRACT

A cap mechanism for use with an ink jet head including a cap member for covering the ink jet head provided with nozzles on the front end face thereof, caps formed on the cap member to fit onto the nozzles and a suction pump communicated with the caps to suck ink in the nozzles, characterized by a means for moving the cap member to and from the ink jet head, a means for driving the suction pump to suck the ink in the nozzles through the caps, and a clutch means for selectively rendering the cap member moving means and the pump driving means operative through a driving source.

4 Claims, 3 Drawing Sheets

CAP MECHANISM FOR USE WITH AN INK JET HEAD

BACKGROUND OF THE INVENTION (a) Field of the Invention

The present invention relates to a cap mechanism for covering the ink jet head employed by the printer of the ink jet type.

(b) Prior Art

The printer of the ink jet type carries out its printing, jetting ink onto a sheet of paper through nozzles arranged on the front face of the ink jet head and when the ink jet head is left unused for a long time after the printing is finished, the ink remaining in the nozzles sets to clog the nozzles, so that the direction in which ink should be jetted through the nozzles cannot be fixed and that the amount of ink to be jetted cannot be kept certain at a next printing process, thereby causing the quality of printing to become worse. Ink may not be jetted through the nozzles in the worst case.

In order to eliminate this drawback, the cap member provided with the fixture which was fitted onto the nozzles and communicated with the suction pump was proposed to cover the ink jet head. When the ink jet head was covered by the cap member and the suction pump was driven, the ink remaining in the nozzles was sucked and removed through the fixture of the cap member.

However, the covering of the cap member relative to the ink jet head and the driving of the suction pump were carried out by hands, thereby causing this operation to be troublesome. When this operation was neglected, however, the nozzles could not be prevented from being clogged by the ink remaining in the nozzles. Further, when the fixture of the cap member was loosely fitted onto the nozzles upon covering the ink jet head with the cap member by hands, the ink in the nozzles could not be sucked and removed completely, while when it was too-closely fitted onto the nozzles, the nozzles were sometimes damaged.

SUMMARY OF THE INVENTION

The present invention is therefore intended to eliminate the above-mentioned drawbacks.

The object of the present invention is therefore to provide a cap mechanism for the ink jet head wherein the covering of the cap member relative to the ink jet head and the sucking of ink in the nozzles through the suction motor can be automatically carried out to reliably prevent the nozzles of the ink jet head from being clogged.

According to the present invention, there can be provided a cap mechanism for the ink jet head provided with nozzles at the front face thereof including a cap member for covering the ink jet head, a fixture of the cap member for fitting onto the nozzles, and a suction pump communicated with the fixture to suck ink in the nozzles, characterized by a means for moving the cap member to and from the ink jet head, by a means for driving the suction pump to suck the ink in the nozzles through the fixture, and by a clutch means for selectively rendering the cap member moving means and the pump driving means operative through a power source.

According to the present invention, the cap member moving means is made operative at first by the driving source to cover the ink jet head with the cap member and the clutch means is then switched and the pump driving means is rendered operative by the driving source to suck and remove the ink in the nozzles through the fixture which is fitted onto the nozzles of the ink jet head. When the above process is associated with the main switch of the printer, therefore, the ink can be reliably sucked and removed from the nozzles at the time when the main switch is turned off.

DETAILED DESCRIPTION OF THE PREFERRED EMBODIMENT

Figure 1:
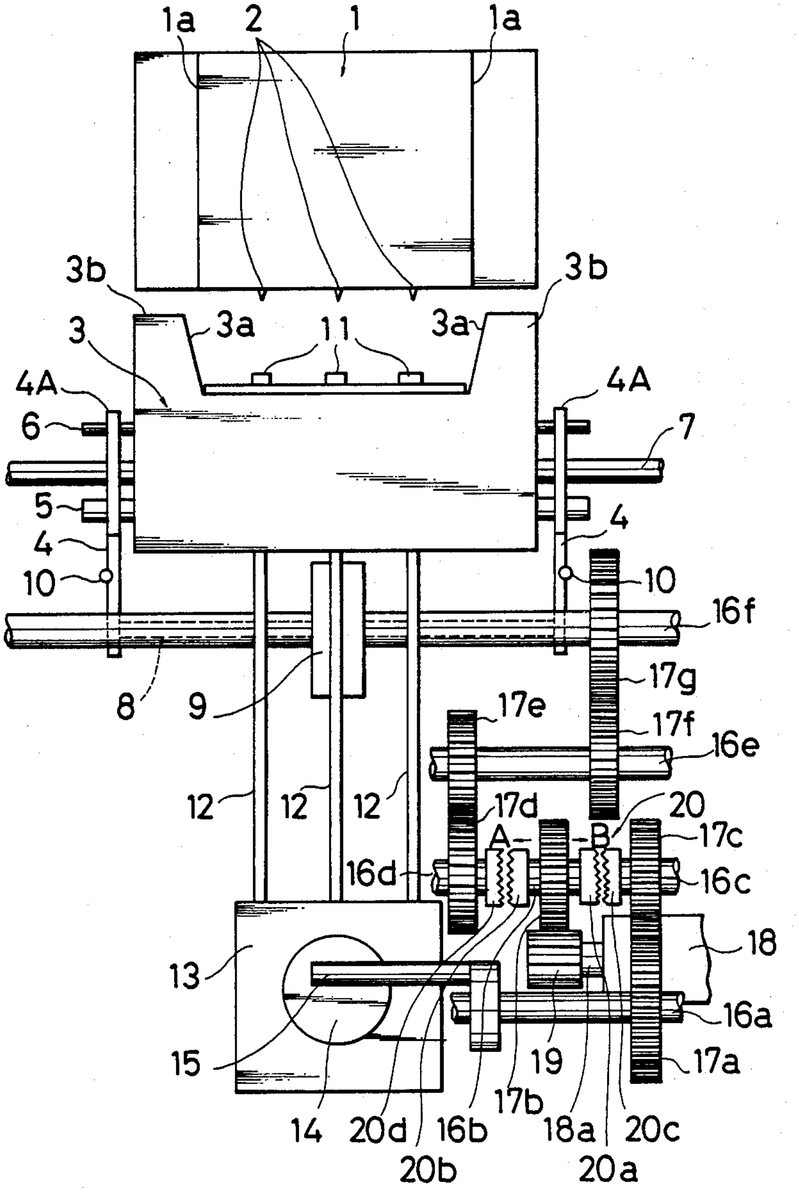
FIG. 1 is a plan view showing an example of the cap mechanism for the ink jet head according to the present invention.
Figure 2:
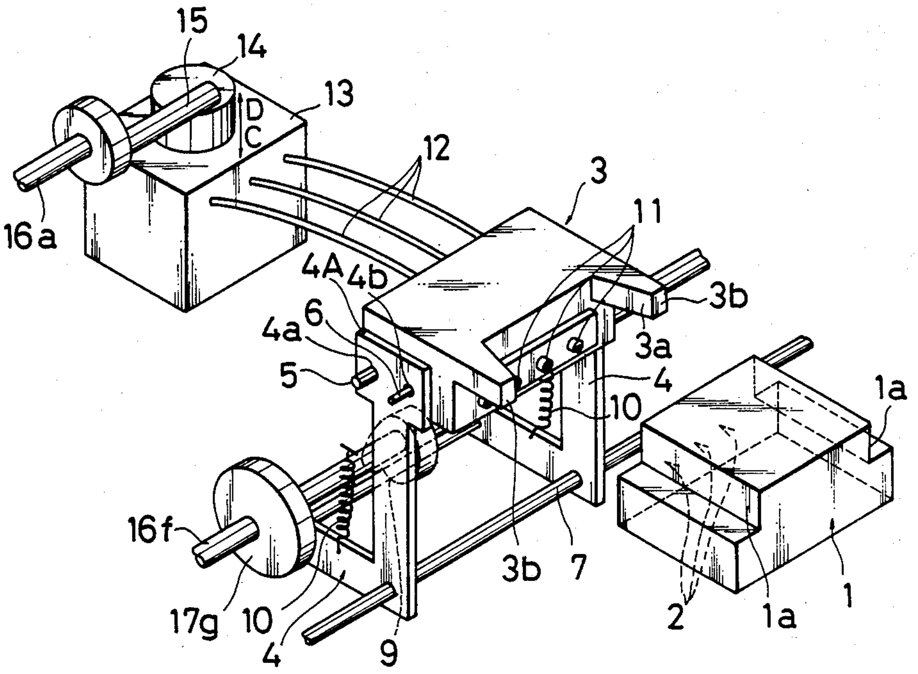
FIG. 2 is a perspective view showing the cap mechanism.

FIGS. 1 and 2 show an embodiment of the present invention. An ink jet head 1 which is an example of the printing head for printing responsive to printing information is arranged freely movable along a platen (not shown), around which a sheet of paper is wound, in the printer of the ink jet head type and a pair of parallel guide faces 1*a* and 1*a* each having a certain width are arranged on both sides of the ink jet head 1. Projected from a face (or front end face), which is directed to the platen, are a plurality of nozzles 2 (three nozzles in this embodiment) made of glass to selectively jet ink.

Figure 3:
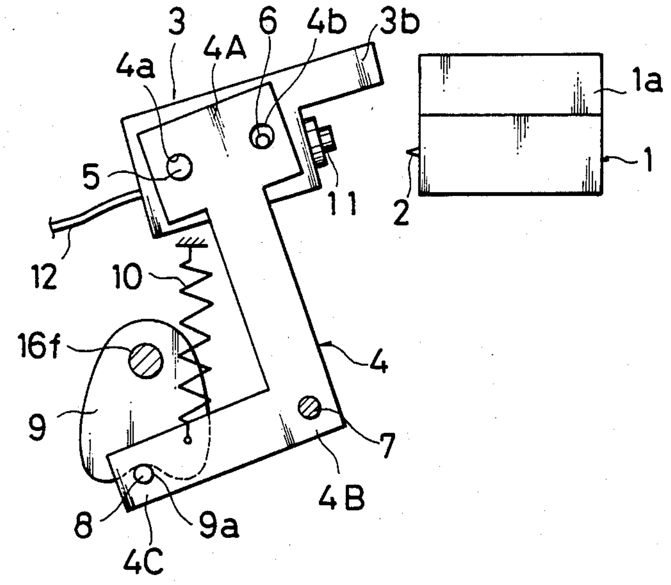
FIGS. 3 and 4 are side views showing the operation of a cam.

The ink jet head 1 shown in FIGS. 1 and 2 stops at its home position where the printing is finished and a cap member 3 for covering particularly the front end face of this ink jet head 1 is arranged opposite to the ink jet head 1 at the home position. Protrusions 3*b* and 3*b* each having a tapered face 3*a* formed at its inner side extend from both sides of the cap member 3 and engage the guide faces 1*a* and 1*a* of the ink jet head 1 to position the cap member 3. The cap member 3 is generally U-shaped and made of synthetic resin not to damage the ink jet head 1 when it covers the ink jet head 1. Support arms 4 and 4 made of metal plate and L-shaped are arranged on both sides of the cap member 3 with a certain interval interposed between the support arm 4 and the cap member 3. An upper wide holder 4A formed on the top of each of the support arms 4 is provided with a circular hole 4*a* through which a shaft 5 projected from both sides of the cap member 3 is freely rotatably supported, and also with a hole 4*b* having a diameter larger than a rod 6 and serving to support the rod 6 a little rotatable around the shaft 5, said rod 6 being projected parallel to the shaft 5 from both sides of the cap member 3. The cap member 3 can therefore rotate along the hole 4*b* and move only the interval between the support arm 4 and the cap member 3 to and from the support arms 4 in the longitudinal direction. A rotatable shaft 7 is passed through bent center portions 4B of the support arms 4 and 4 and the lower end portions 4C of the support arms 4 and 4 are bridged by an engaging shaft 8. Engaged with the engaging shaft 8 is a heart-shaped cam 9 which is fitted onto a transmission shaft 16*f*, which will be described later, to serve as a driving means for the cap member 3. The cam 9 has a recess 9*a* at its front end, an arc-like base and quadric surfaces at its both sides. The cam 9 is rotated following the transmission shaft 16*f* and sliding on the engaging shaft 8 to rotate the support arms 4 and 4. One end of a spring 10 is connected to each of the support arms 4 in the vicinity of the engaging shaft 8 while the other end thereof to a fixed member such as the frame (not shown) and the support arms 4 and 4 are urged clockwise in FIG. 3 by means of spring 10.

Formed in a fixture on that side of the cap member 3 which faces the ink jet head 1 and made of rubber are caps 11 corresponding to their nozzles, and each of the caps 11 is comparatively closely fitted onto the nozzle 2 when the ink jet head 1 is covered by the cap member 3. Each of the caps is also connected to a box-like suction pump 13 through a tube 12 which extends from the cap member 3.

A cylindrical piston rod 14 is arranged in the center of the suction pump 13 to move up and down in directions shown by C and D in FIG. 2 and a pump pressure arm 15 which serves as a driving means for the piston rod 14 is contacted with the top of the piston rod 14. When the pump pressure arm 15 pushes the piston rod 14 in the direction C in FIG. 2, the suction pump 13 generates suction force through the tubes 12. This suction pump 13 has a capacity which enables all of ink in the nozzles to be sucked and removed when the piston rod 14 once moves down. When the pump pressure arm 15 is released from the piston rod 14, the piston rod 14 is moved upward in the direction D in FIG. 2 and returned to its original position by means of a spring (not shown).

The pump pressure arm 15 extends from a position eccentric to a transmission shaft 16*a*, on which a transmission gear 17*a* is fitted. A motor 18 which is an example of the driving source is arranged adjacent to the transmission gear 17*a* and a pinion 19 is fitted onto an output shaft 18*a* of this motor 18. A transmission gear 17*b* which is a main gear engaged with the pinion 19 is fitted onto a transmission shaft 16*b* which can move in its axial direction. Attached to both ends of the transmission shaft 16*b* are clutch plates 20*a* and 20*b* of a clutch means 20. Corresponding to the clutch plate 20*a*, a clutch plate 20*c* which forms a first clutch along with the clutch plate 20*a* is fitted onto a transmission shaft 16*c* to engage the clutch plate 20*a*. Also fitted onto the transmission shaft 16*c* is a transmission gear 17*c* engaged with the transmission gear 17*a*. Corresponding to the clutch plate 20*b*, a clutch plate 20*d* which forms a second clutch along with the clutch plate 20*b* is fitted onto a transmission shaft 16*d* to engage the clutch plate 20*b*. A transmission gear 17*d* is also fitted onto the transmission shaft 16*d*. A transmission shaft 16*e* is arranged adjacent to the transmission gear 17*d* and parallel to the transmission shaft 16*d* and a transmission gear 17*e* which is engaged with the transmission gear 17*d* is fitted onto the transmission shaft 16*e*. A transmission gear 17*f* is also fitted on the transmission shaft 16*e* and engaged with a transmission gear 17*g* which is fitted onto the transmission shaft 16*f*. Also fitted onto the transmission shaft 16*f* is the cam 9 which is engaged with the engaging shaft 8.

The driving force of the motor 18 is transmitted to the transmission gear 17*b* through the pinion 19, as described above, and the transmission shaft 16*b* onto which the transmission gear 17*b* is fitted is urged in a direction shown by an arrow A in FIG. 1 by means of an spring means (not shown) to transmit the driving force of the motor 18 to the transmission shaft 16*d* for the cap member moving means through the clutch plates 20*b* and 20*d* of the second clutch which are engaged with each other. As the result, the drive of the motor 18 is transmitted from the transmission shaft 16*d* to the cam 9 through the transmission shafts 16*e* and 16*f* and the cap member 3 is driven by the rotating cam 9. A solenoid (not shown) is connected to the transmission shaft 16*b* and when the solenoid is turned on, the transmission shaft 16*b* is urged in a direction shown by an arrow B in FIG. 1 against the spring means to engage the clutch plates 20*a* and 20*c* with each other, so that the drive of the motor 18 can be transmitted to the transmission shaft 16*a* for the pump driving means to drive the piston rod 14 through the eccentrically-positioned pump pressure arm 15.

Figure 4:
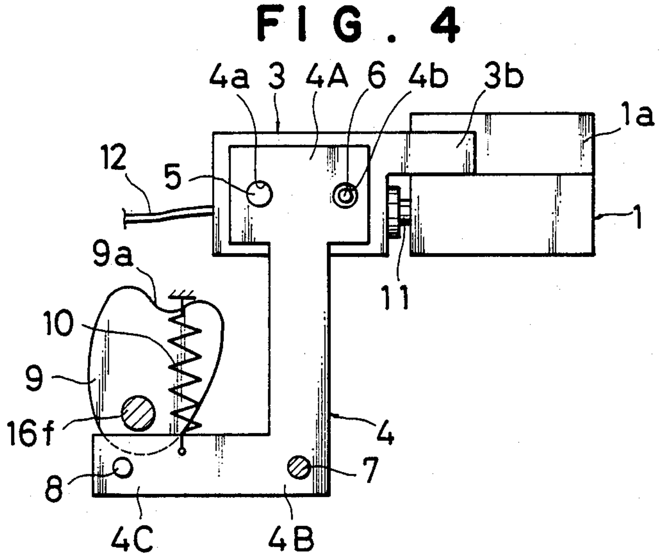

When the printing of the ink jet head 1 is finished and the main switch (not shown) is turned off, the ink jet head 1 moves to its home position and stops there, and the motor 18 is driven by the action of a relay associated with the main switch. The pinion 19 is rotated by this motor 18 and the transmission gear 17*b* which is engaged with the pinion 19 is thus rotated. Since the solenoid (not shown) is under off-state at this time, the clutch plates 20*b* and 20*d* of the second clutch are engaged with each other by the action of the spring means (not shown) to transmit the rotating force of the transmission gear 17*b* to the transmission gear 17*d* through the transmission shaft 16*d*, and the transmission gear 17*d* is thus rotated. The transmission gear 17*e* which is engaged with the transmission gear 17*d* is rotated and this rotating force is transmitted to the transmission gear 17*g* through the transmission shaft 16*e* and the transmission gear 17*f*. The transmission gear 17*g* is thus rotated and this rotating force is transmitted to the cam 9 through the transmission shaft 16*f*. When the cam 9 rotates sliding on the engaging shaft 8, its recess 9*a* is released from the engaging shaft 8 and its remaining circumferential face is slidably contacted with the engaging shaft 8. The interval between the engaging shaft 8 and the transmission shaft 16*f* on which the cam 9 is supported thus becomes smaller and smaller and the support arms 4 are gradually swung clockwise from their state shown in FIG. 3. The tapered faces 3*a* on both sides of the cap member 3 which is supported by the support arms 4 are guided by the guide faces 1*a* on both sides of the ink jet head 1 to slightly adjust the cap member 3 along the swing shaft 5 and the cap member 3 thus comes nearer and nearer the ink jet head 1. The cam 9 is separated from the engaging shaft 8, as shown in FIG. 4, at the final stage and the support arms 4 are sufficiently swung clockwise by the action of the springs 10, so that the cap member 3 can be fully pressed against the ink jet head 1 with a certain pressure to cover the latter. The cap member 3 can be slightly adjusted around the swing shaft 5, thereby enabling the caps 13 of the cap member 3 to be reliably fitted onto the nozzles 2 of the ink jet head 1 to prevent any air leakage.

When the cap member 3 covers the ink jet head 1, the solenoid which has been under off-state is turned on by the action of a limit switch or the like. As the result, the transmission shaft 16*b* moves in the direction B in FIG. 1 against the spring means, the clutch plates 20*a* and 20*c* of the first clutch are engaged with each other, the transmission gear 17*c* is rotated by the motor 18 through the transmission shaft 16*c*, the transmission gear 17*a* which is engaged with the transmission gear 17*c* is thus rotated, this rotating force is transmitted to the pump pressure arm 15 through the transmission shaft 16*a*, and the pump pressure arm 15 pushes down the piston rod 14, so that all amount of ink remaining in the nozzles 2 can be sucked through the tubes 11 communicated with the suction pump 12.

When the piston rod 14 of the suction pump 12 reaches its lowest position, the motor 18 is immediately turned off but the resistant force of the motor 18 can be transmitted to the pump pressure arm 15 due to the action of the solenoid. The piston rod 14 can be therefore held at its bottom dead center for a short time. This enables the suction force of the suction pump 13 to be reliably transmitted to the nozzles 2 and the ink in the nozzles 2 to be reliably sucked and removed. The solenoid is then turned off by a timer or the like and the piston rod 14 lifts to return to its original position thanks to its self-returning force. The printer is then stopped completely.

When the main switch is turned on to again carry out the printing operation, motor 18 is switched on to release the cap member 3 from the ink jet head 1 and the cam 9 is rotated till its recess 9a engages the engaging shaft 8. When the cam 9 reaches this position, the motor 18 is stopped to stop the cam 9. The support arms 4 are thus swung anti-clockwise to separate the cap member 3 from the ink jet head 1, thereby making the ink jet head 1 ready for a next printing. The engaging shaft 8 is engaged with the recess 9a of the cam 9 at this time and held there not to move along the circumferential face of the cam 9 even when the springs 10 cause the support arms 4 to be swung to lift the engaging shaft 8.

According to the present invention as described above, the ink jet head 1, particularly its front end face is automatically covered by the cap member 3, synchronizing with the main switch, and the caps of the cap member 3 are thus fitted onto the nozzles of the ink jet head 1, so that the ink remaining at the tips of the nozzles 2 can be sucked and removed by the suction pump 13 which is communicated with the nozzles 2 through the caps 13 and the tubes 12. The clogging of the nozzles 2 can be therefore prevented and a high quality of printing can be achieved.

It should be understood that the present invention is not limited to the above-described embodiment but that various changes and modifications can be made without departing from the spirit and scope of the present invention.

According to the present invention as described above, the covering of the cap member relative to the ink jet head and the sucking of the suction motor relative to the ink in the nozzles can be automatically carried out to reliably prevent the nozzles from being clogged and damaged.

I claim:

1. A cap mechanism for use with an ink jet head comprising:

a cap member for covering the ink jet head provided with nozzles on a front end face thereof;

caps formed on the cap member to fit onto the nozzles and a suction pump communicated with the caps to suck ink in the nozzles;

means for moving the cap member to and from the ink jet head;

means for driving the suction pump to suck the ink in the nozzles through the caps;

driving source means for providing a driving source; and clutch means for selectively rendering the cap member moving means and the driving means operative through the driving source means;

wherein said clutch means has a pair of clutches to which the driving force of the driving source means is selectively transmitted responsive to on- and off- states of a solenoid.

2. A cap mechanism according to claim 1, wherein said suction pump has self-returning force.

3. A cap mechanism according to claim 2, wherein said cap member includes tapered faces for fitting the caps onto the nozzles of said ink jet head.

4. A cap mechanism according to claim 1, wherein said cap member includes tapered faces for fitting the caps onto the nozzles of said ink jet head.

* * * * *